United States Patent
Faber et al.

(10) Patent No.: US 9,563,807 B2
(45) Date of Patent: Feb. 7, 2017

(54) METHOD FOR ANALYZING AN IMAGE RECORDED BY A CAMERA OF A VEHICLE AND IMAGE PROCESSING DEVICE

(75) Inventors: Petko Faber, Renningen (DE); Gregor Schwarzenberg, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 197 days.

(21) Appl. No.: 14/008,895

(22) PCT Filed: Feb. 2, 2012

(86) PCT No.: PCT/EP2012/051771
§ 371 (c)(1),
(2), (4) Date: Dec. 31, 2013

(87) PCT Pub. No.: WO2012/130507
PCT Pub. Date: Oct. 4, 2012

(65) Prior Publication Data
US 2014/0112532 A1    Apr. 24, 2014

(30) Foreign Application Priority Data
Mar. 31, 2011  (DE) .................. 10 2011 006 564

(51) Int. Cl.
*G06K 9/00* (2006.01)
*B60R 1/00* (2006.01)

(52) U.S. Cl.
CPC ............ *G06K 9/00791* (2013.01); *B60R 1/00* (2013.01); *B60R 2300/306* (2013.01); *B60R 2300/307* (2013.01)

(58) Field of Classification Search
CPC ........... G06K 9/00791; G06K 9/00798; G06K 9/00805; G06K 9/00818; G06K 9/00825
See application file for complete search history.

(56) References Cited

U.S. PATENT DOCUMENTS 6,813,545 B2 * 11/2004 Stromme .................. 701/1
7,551,804 B2    6/2009 Baer et al.
(Continued)

FOREIGN PATENT DOCUMENTS

DE    10 2005 045 077    6/2006
DE    10 2005 045 017    3/2007
(Continued)

OTHER PUBLICATIONS

International Search Report, PCT International Application No. PCT/EP2012/051771, dated May 15, 2012.
(Continued)

*Primary Examiner* — Wesley Tucker
(74) *Attorney, Agent, or Firm* — Norton Rose Fulbright US LLP; Gerard Messina (57) ABSTRACT

A method for analyzing an image recorded by a camera of a vehicle. The method includes a step of reading the image of the camera. Furthermore, the method includes a step of recognizing at least one object in a subsection of the image, the subsection imaging a smaller area of the vehicle surroundings than the image. Furthermore, the method includes a step of transmitting the subsection and/or information about the subsection of the image to a driver assistance module. Finally, the method includes a step of using the subsection of the image and/or the information about the subsection of the image instead of the entire image in the driver assistance module, in order to analyze the image recorded by the camera.

19 Claims, 3 Drawing Sheets

(56) References Cited

U.S. PATENT DOCUMENTS

| | | |
|---|---|---|
| 8,218,009 B2 | 7/2012 | Heinrich et al. |
| 2007/0255480 A1* | 11/2007 | Southall et al. ............... 701/96 |
| 2008/0030374 A1 | 2/2008 | Kumon et al. |
| 2009/0192686 A1 | 7/2009 | Niehsen et al. |
| 2009/0225189 A1* | 9/2009 | Morin .................... H04N 5/345 348/229.1 |
| 2011/0228089 A1 | 9/2011 | Almeida |
| 2012/0253596 A1* | 10/2012 | Ibrahim ............. G06K 9/00798 701/36 |

FOREIGN PATENT DOCUMENTS

| | | |
|---|---|---|
| DE | 10 2006 004 770 | 5/2007 |
| DE | 10 2006 055 906 | 6/2007 |
| DE | 10 2007 000 420 | 4/2008 |
| DE | 10 2006 055 904 | 5/2008 |
| DE | 10 2007 034 196 | 1/2009 |
| DE | 10 2008 059 630 | 6/2010 |
| DE | 10 2009 012 758 | 9/2010 |
| EP | 2 040 196 | 3/2009 |
| JP | 2003-36494 | 2/2003 |
| JP | 2006-193068 | 7/2006 |
| JP | 2006-244331 | 9/2006 |
| JP | 2007-15525 | 1/2007 |
| JP | 2008-54171 | 3/2008 |
| JP | 2008-176357 | 7/2008 |
| JP | 2010-165204 | 7/2010 |

OTHER PUBLICATIONS

Chen at al., "Traffic Sign Detection and Recognition for Intellligent Vehicle," *Intelligent Vehicles Symposium (IV)*, pp. 908-913, Jun. 2011.

Graefe, "Echzeit-Bildverarbeitung für eln Fahrer-Unterstützungssystem zum Einsatz auf Autobahnen," *IT + TI Informationstechnik and Technische Informatik*, vol. 36, No. 1, pp. 16-25, Feb. 1994.

Vlacic et al., "Intelligent Vehicle Technologies," *SAE International*, pp. 118-119, 2001.

* cited by examiner

METHOD FOR ANALYZING AN IMAGE RECORDED BY A CAMERA OF A VEHICLE AND IMAGE PROCESSING DEVICE

FIELD

The present invention relates to a method for analyzing an image recorded by a camera of a vehicle, a corresponding image processing device, and a corresponding computer program product.

BACKGROUND INFORMATION

The growing complexity of the demands on the various video-based systems in vehicles requires a necessary "cooperation" of the individual systems with one another. Thus, for example, information of lane recognition may be used for online calibration; the result of the vehicle detection may be used to reduce the number of incorrect classifications in the system for traffic sign recognition, which are caused by speed signs on trucks, for example. The number of cooperations, which are only mentioned here as examples, between various systems may be expanded arbitrarily.

A method for lane detection using a driver assistance system of a vehicle, which includes a sensor system for lane recognition, is described in German Patent Application No. DE 10 2007 034 196 A1, in which measuring points representing lane markings are detected using the sensor system for lane recognition in an area of a traffic space located ahead of the vehicle. An ideal number of measuring points MP is ascertained based on a reference model. A degree of plausibility of the look-ahead range is determined from a comparison between the number of the actually detected measuring points and the ideal number of measuring points.

SUMMARY

The present invention provides a method for analyzing an image recorded by a camera of a vehicle, also an image processing device which uses this method, and finally a corresponding computer program product. Advantageous embodiments are described below.

In accordance with the present invention, an example method for analyzing an image recorded by a camera of a vehicle is provided, the example method including the following:

reading the image of the camera;
recognizing at least one object in a subsection of the image, the subsection imaging a smaller area of the vehicle surroundings than the image;
transmitting the subsection and/or information about the subsection of the image to a driver assistance module, in particular the driver assistance module implementing a driver assistance function, which differs from solely analyzing the image recorded by the camera; and
using this subsection of the image and/or the information about the subsection of the image instead of the entire image in the driver assistance module in order to analyze the image recorded by the camera.

Furthermore, in accordance with the present invention, an example image processing device is provided, which is designed to carry out or implement steps of the example method according to the present invention in corresponding units. An object on which the present invention is based may also be achieved rapidly and efficiently by this embodiment variant of the present invention in the form of a device.

A device, in particular an image processing device, may be understood in the present case as an electrical device, which processes sensor signals and outputs control signals as a function thereof. The device may have an interface, which may be designed using hardware and/or software. In the case of a hardware design, the interfaces may be part of a so-called system ASIC, for example, which contains greatly varying functions of the device. However, it is also possible that the interfaces are separate integrated circuits or at least partially include discrete components. In the case of a software design, the interfaces may be software modules which are provided on a microcontroller in addition to other software modules, for example.

A computer program product having program code, which may be stored on a machine-readable carrier such as a semiconductor memory, a hard drive memory, or an optical memory and is used to carry out steps of the method according to one of the above-described specific embodiments is also advantageous if the program is executed on an image processing device or a device corresponding to a computer.

A camera may be understood as an optical recording unit for registering vehicle surroundings in the spectral range of visible light. An object which is recognized in an image of the camera may be a structural unit on the roadway edge (for example, a reflector post or a street light) or on the roadway (for example, a road marking), or also a moving object on the roadway (for example, a vehicle). The image of the camera may be recorded in particular in darkness or at night, the objects being distinguished by a significantly elevated brightness in relation to the image background or other image areas. A subsection may be understood to be a subarea of the image which images a smaller area of the vehicle surroundings than the image of the camera. In particular, a subsection may be considered to be an area of the image which does not include at least one other section of the image. The subsection of the image forms an area around an object or objects of the vehicle surroundings recognized as an "object" or multiple "objects" in the camera image. The subsection of the image may include an area around the object or objects recognized as the "object(s)." Information about the subsection of the image may be understood, for example, as a position and/or size of the section, in which the object or objects are recognized in the image. Furthermore, the information about the subsection of the image may also relate to a parameter of the object, for example, a brightness and/or a color. In addition, of course, the content of the camera image in the corresponding subsection may also be transmitted to the driver assistance module as the information about the subsection. A driver assistance module may be understood to be a unit which executes a driver assistance function in order to relieve a driver of the vehicle while driving the vehicle. For example, a driver assistance function may implement an automatic recognition of traffic signs, a lane detection, and/or a multiple object recognition, in order to be able to recognize one or multiple vehicles ahead of the host vehicle, for example. The driver assistance module may carry out an output to the driver of the vehicle, in order to make driving the vehicle easier for him or her, for example, to keep to a curving lane, on which the vehicle is presently located. The driver assistance function includes at least one further functionality, which differs from solely studying and dividing the camera image into different subsections of the image recorded by the camera, for example, analyzing the content of traffic signs and, in response thereto, outputting an information signal to the driver of the vehicle, recognizing and extrapolating a lane from recognized roadway markings, and, in response thereto, outputting a lane tracking signal or recognizing braking of preceding vehicles and, in response thereto, outputting a warning signal or outputting an automatic braking signal for braking the vehicle.

The present invention is based on the finding that only the subsection of the image or information about the subsection of the image needs to be analyzed in the driver assistance module, instead of the entire image of the camera, in order to be able to actually optimally use the driver assistance module or the function of the relevant driver assistance module. An algorithm of the driver assistance module is generally based on the fact that an image of the camera, which is sometimes very large, must be searched through for objects which are often small, in order to provide a corresponding assistance function to the driver. If a crude analysis of the image for objects contained therein (in particular using an algorithm optimized in particular to the object search) has already been carried out in an early stage and in this way one or multiple subsections of the image have been recognized, in which objects were detected, this subsection/these subsections may be transmitted to the affected driver assistance module. The driver assistance module then only needs to search through a small subsection of the image, so that advantageously a numerical or circuitry-wise data transmission load in this driver assistance module may be reduced. For the case in which multiple different driver assistance modules are supplied with a camera image preprocessed in this way, i.e., are supplied with a subsection relevant for the particular driver assistance module, savings of computing time may be achieved in this way in multiple of the affected driver assistance modules, which results, on the one hand, in more rapid processing time and, on the other hand, in lower power consumption of the affected driver assistance modules.

According to one advantageous specific embodiment of the present invention, in the step of transmitting, a dimension and/or a position of the subsection in the image may be transmitted as the information. A dimension and/or a position of the subsection of the image may represent a shape of the subsection of the image, for example, a rectangular shape, an oval shape, or an orientation of the subsection, for example, with specification of an angle of the subsection in relation to an upper or lower edge of the camera image. A position of the subsection of the image may represent, for example, coordinates of a corner point of the subsection in the camera image. Such a specific embodiment of the present invention offers the advantage that a position of the subsection in the camera image may be transmitted using very few parameters.

Furthermore, it may be advantageous if, in the step of recognizing, a color and/or a brightness of the object is/are recognized and, in the step of transmitting, the recognized color and/or brightness is/are also transmitted to the driver assistance module as the information. A brightness may be understood as a luminosity and/or a pulsing or a pulse frequency of the light of an area of the camera image recognized as an object. A color of the object may be understood as a spectral frequency of the light of the area of the camera image recognized as the object. Such a specific embodiment of the present invention offers the advantage that additional information may be transmitted as a parameter to the affected driver assistance module in a technically simple way.

It may be particularly advantageous if, in the step of recognizing, at least one traffic sign is recognized as an object in the subsection of the image and, in the step of transmitting, the subsection and/or the information about the subsection is/are transmitted to a traffic sign recognition module as the driver assistance module. Such a specific embodiment of the present invention offers the advantage that, already during the analysis of the camera image, an object may be recognized as a traffic sign and supplied to a recognition module which is designed especially for recognizing traffic signs as the driver assistance module. A complete search through the entire camera image by the traffic sign recognition module using a correspondingly complex recognition algorithm may thus be avoided.

According to another specific embodiment of the present invention, in the step of recognizing, at least one self-luminous object is differentiated from at least one externally irradiated object, in order to establish the subsection of the image. A self-luminous object may be an object which actively emits light. Such a self-luminous object may be a headlight or a headlight pair of an oncoming vehicle, for example. In contrast, an externally irradiated object may be a traffic sign, for example. Such a specific embodiment of the present invention offers the advantage, for example, from the analysis of the spectral composition of the light detected by the camera, of making a differentiation as to whether an object emits light itself or is illuminated (for example, by the headlights of the host vehicle). Such a differentiation allows an early recognition and/or classification of objects, so that these objects may also be supplied to different driver assistance modules. For example, a subsection of the camera image in which a self-luminous object was recognized may be supplied to a headlight control module, while in contrast a subsection of the camera image in which an externally irradiated object was recognized may be supplied to a lane detection module, the affected objects being able to be interpreted as reflector posts, for example.

Furthermore, according to another specific embodiment of the present invention, in the step of recognizing, at least one reflector post and/or at least one street lighting unit may be recognized as an object in the subsection of the image and, in the step of transmitting, the subsection and/or the information about the subsection may be transmitted to a lane detection module and/or a lane guiding module and/or a light control system as the driver assistance module. Such a specific embodiment of the present invention offers the advantage of particularly favorable preprocessing of the read-in camera image, so that a lane detection module and/or a lane guiding module for the vehicle must bear a lower processing load. A lane detection module may be understood in this case to be a driver assistance function, in the case of which the lane to be traveled by the host vehicle is estimated beforehand and in the case of which an assistance for the driver for holding this lane is possibly output by corresponding control signals to further vehicle components. A lane guiding module may be understood to be a driver assistance function, in the case of which the vehicle is actively held on a desired lane of the roadway.

In order to achieve a particularly low data processing load of a lane detection module, a lane guiding module, and/or a light control system, according to another specific embodiment of the present invention, in the step of recognizing, at least taillights of a preceding vehicle may be recognized as an object in the subsection of the image and, in the step of transmitting, the subsection and/or the information about the subsection may be transmitted to a light control system and/or a lane detection module and/or a lane guiding module as the driver assistance module. The taillights of a preceding vehicle may be recognized as such, for example, based on their color and/or their distance to one another. For example, the light control system may align a light cone of the vehicle in such a way that one or multiple preceding vehicles, whose taillights were recognized as an object, for example, are not dazzled. Alternatively or additionally, a lane detection module may also determine a lane course which is not illuminated by the headlights of the host vehicle from a subsection of the camera image, in particular from a position of an object which was classified as the taillights of a preceding vehicle.

An advantage of the above-proposed method may be particularly great if, according to one specific embodiment of the present invention, in the step of reading, an image of the camera which was recorded by the camera in darkness is read in. Darkness is to be understood as a brightness of the vehicle surroundings which makes it necessary (for example, in accordance with the traffic regulations), to drive with headlights turned on. Such a specific embodiment of the present invention offers the advantage that the analysis capability of the driver assistance module is significantly increased, since the recognition of objects is very difficult in particular in darkness. If a prior analysis or prior processing of the camera image has already been performed using an algorithm which is especially designed for camera images recorded in darkness, this may substantially reduce the data processing load of the particular driver assistance module or modules to which the subsection is transmitted.

The above-described approach may be used particularly advantageously if not only one single driver assistance module is supplied with a subsection of the camera image, but rather if a separate subsection of the camera image is transmitted to each of multiple different driver assistance modules, which includes the objects recognized as relevant for the particular driver assistance function. In this way, by way of central uniform preprocessing of the camera image, a substantial reduction of the data processing load may be achieved in the downstream driver assistance modules, which further increases the efficiency of the approach provided here. Therefore, according to another specific embodiment of the present invention, in the step of recognizing, at least one further object may be recognized in a further subsection of the image, the further subsection imaging a smaller area of the vehicle surroundings than the image. Furthermore, in the step of transmitting, the further subsection and/or further information about the further subsection of the image is transmitted to a further driver assistance module, the further driver assistance module differing from the driver assistance module. Furthermore, in the step of using, the further subsection is used instead of the entire image in the further driver assistance module in order to analyze the image recorded by the camera.

BRIEF DESCRIPTION OF THE DRAWINGS

The present invention is explained in greater detail by way of example on the basis of the figures.

DETAILED DESCRIPTION OF EXAMPLE EMBODIMENTS

In the description of preferred exemplary embodiments of the present invention, identical or similar reference numerals are used for the elements which are shown in the various figures and act similarly, a repeated description of these elements being omitted.

Figure 1:
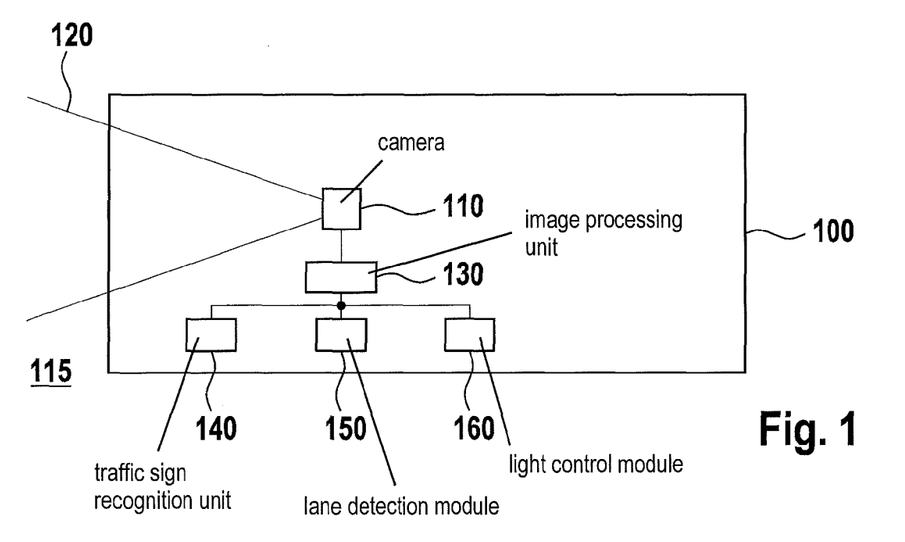
FIG. 1 shows a block diagram of a vehicle in which an exemplary embodiment of the present invention is used.

FIG. 1 shows a block diagram of a vehicle 100, in which an exemplary embodiment of the present invention is used. Vehicle 100 includes a camera 110, which registers vehicle surroundings 115 from a viewing angle 120. In particular, camera 110 may be designed in order to detect objects in vehicle surroundings 115, in particular in darkness. The image recorded by camera 110 is subsequently analyzed in an image processing unit 130, objects being recognized in the camera image, and subsections which contain these objects being produced. These subsections or information about these subsections may then be transmitted to various driver assistance modules, such as a traffic sign recognition module 140, a lane detection module 150, or a light control module 160 for controlling the headlights of vehicle 100. For example, it may be recognized in image processing unit 130 from the image recorded by camera 110 on the basis of specific geometric shapes and/or colors that traffic signs are contained in a specific subsection of the image recorded by camera 110. A subsection which contains such traffic signs in the camera image is then transmitted to traffic sign recognition module 140, for example. For example, reflectors of reflector posts are recognized in another subsection of the camera image, so that this subsection of the camera image is transmitted to lane detection module 150, for example. For example, if headlights of an oncoming vehicle are recognized as an object, an image section of the camera image which includes these objects recognized as headlights may be transmitted to light control module 160, which aligns the headlights or a light cone of the headlights in such a way that a driver of the oncoming vehicle is not dazzled.

Figure 2:
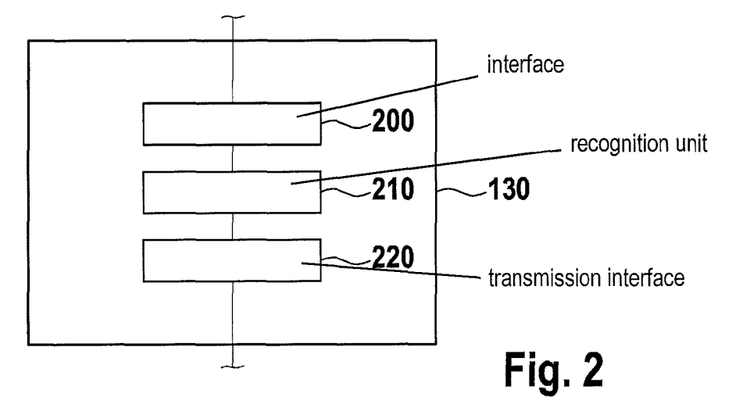
FIG. 2 shows a block diagram of an exemplary embodiment of the image analysis device according to the present invention.

FIG. 2 shows a block diagram of an exemplary embodiment of image processing device or unit 130 according to the present invention. Image processing device 130 includes an interface 200 for reading the image of camera 110. Furthermore, image processing device 130 includes a recognition unit 210 for recognizing at least one object in a subsection of the image. In addition, image processing device 130 includes a transmission interface 220 for transmitting the subsection and/or information about the subsection of the image to a driver assistance module. This driver assistance module may be, for example, traffic sign recognition module 140, lane detection module 150, or light control module 160.

The approach provided here relates in particular to providing and consequently using information, which is presently only internally used in the system "vehicle detection at darkness" (VDD), for the definition or restriction of search areas of other systems such as traffic sign recognition or lane recognition assistance.

Therefore, the VDD system at night is comparable to a so-called base function, on the results of which further functions and systems may build. By linking the function "VDD," in particular the recognition of objects in the vehicle surroundings in darkness, with other (driver assistance) functions, the performance of the further (driver assistance) functions may be significantly increased at least at night (i.e., in general in darkness) or in situations in which vehicles travel with external lighting turned on.

The utilization of additional information, for example, the position of classified traffic signs or also their pulsing (i.e., the information about pulsed/non-pulsed light objects in the vehicle surroundings) in the case of variable message signs, may advantageously be used in the system for traffic sign recognition in order to reliably detect traffic signs already at a greater distance (for example, greater than 150 m) and to adapt a classification strategy for the signs accordingly. VDD may also carry out a classification of objects which are recognized as traffic signs into "self-luminous" or "illuminated by the host vehicle's headlights." The positions of the detected reflector posts may advantageously be used in the system for lane detection in order to significantly restrict the search range for the lanes or to stabilize existing detections or check them for plausibility. Street lights classified as objects by system VDD are additionally of interest for the lane detection in the case of color analysis of the lines, since, for example, street lights or tunnel lighting makes the yellow classification of lines much more difficult. Any exclusion of image areas (i.e., subsections of the camera image) provided by the VDD for other (driver assistance) functions finally results in a reduced computing time of the overall system.

Figure 3:
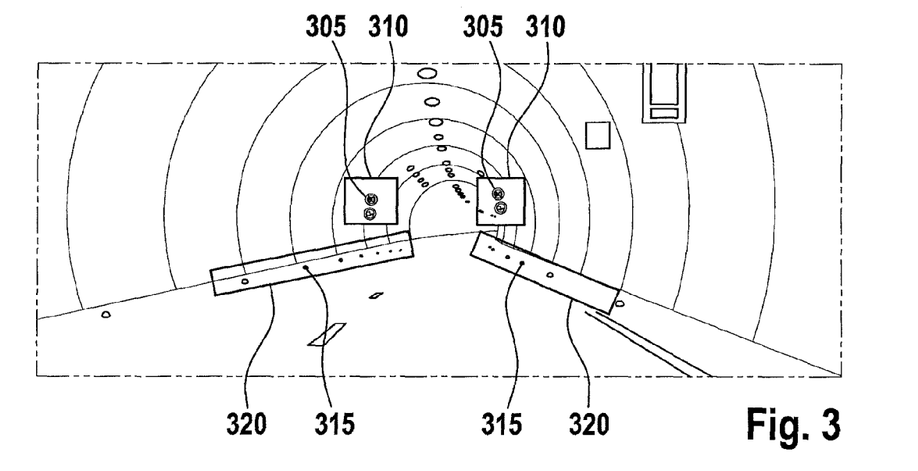
FIG. 3 shows an exemplary embodiment of a camera image, as was recorded by the camera from FIG. 1 when viewing vehicle surroundings.

FIG. 3 shows an exemplary embodiment of a camera image 300, as was recorded by camera 110 from FIG. 1 when viewing vehicle surroundings. As an example, FIG. 3 shows the detection by function VDD of variable message signs 305 on the basis of the color (mostly red) and/or their pulsing if light-emitting diodes are used by variable message signs 305. These variable message signs are recognized in two subsections 310 of camera image 300, which may then be transmitted to traffic sign recognition module 140 according to FIG. 1. The transmission may take place in such a way that subsections 310 themselves or only information about the size and position of subsections 310 are transmitted to traffic sign recognition module 140, in which the objects recognized as "traffic signs" are contained. A dimension of subareas or subsections 310 may be selected in such a way that a certain detail having an edge of a predefined dimension around the objects recognized as traffic signs is considered to be a subsection. A shape of the subsection, for example, a rectangular shape, may also be selected in order to be able to ensure a good processability of the subsections in the driver assistance module as much as possible. In this way, possible early detection of traffic signs is possible, without traffic sign recognition module 140 having to analyze complete camera image 310 with high numeric or circuitry-wise expenditure. Subsections 310 each include an area of camera image 300 which is smaller than entire camera image 200.

Another example of the formation of subsections of camera image 300 is the detection of reflector posts, lateral lane markings 315, or also Botts' dots (in tunnels or as a road boundary, for example) by function VDD (i.e., image analysis device 130), for example, on the basis of their color (mostly yellow) of such recognized objects or as "externally illuminated objects" ahead of the vehicle. Such a detection of structural measures in vehicle surroundings 115 is also shown in FIG. 1, the subsections of the camera image which include these reflecting elements being considered to be further subsections 320, which are transmitted to lane detection module 150 according to FIG. 1, for example. A function for lane detection may therefore intelligently adapt its own search areas based on this additional information.

Figure 4:
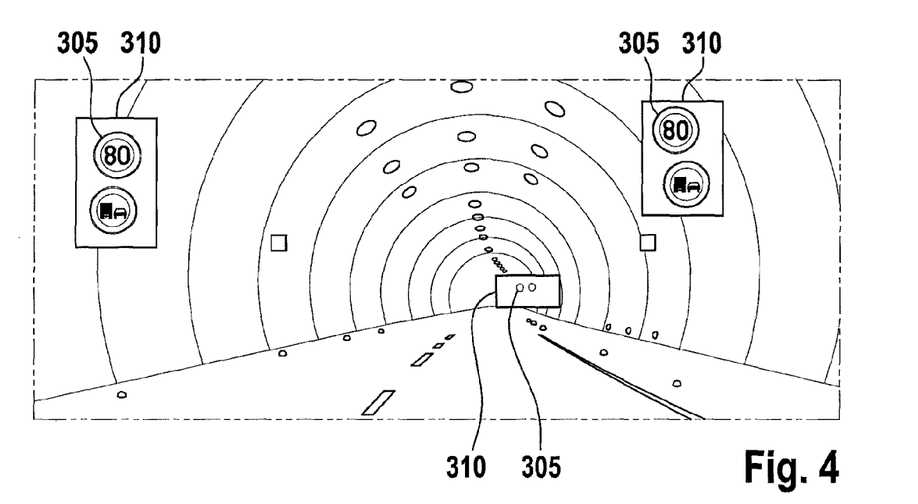
FIG. 4 shows another exemplary embodiment of a camera image, as was recorded by the camera from FIG. 1 when viewing vehicle surroundings.

FIG. 4 shows another exemplary embodiment of a camera image 300 which a camera 110 according to FIG. 1 has recorded of vehicle surroundings. Multiple traffic signs 305 are also recognized again, which are transmitted as subsections 310 to traffic sign recognition module 140 according to FIG. 1, for example. Multiple different subsections 310 which are separate from one another may also be produced, in which objects are recognized as traffic signs, these individual or separate subsections 310 both being transmitted to traffic sign recognition module 140. Therefore, not only different subsections must be transmitted to different driver assistance modules; rather, multiple different subsections may also be transmitted to one single driver assistance module.

Figure 5:
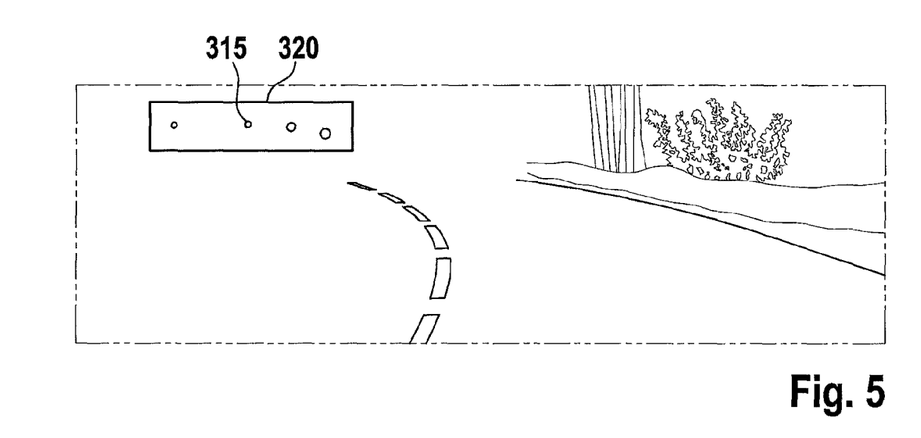
FIG. 5 shows another exemplary embodiment of a camera image, as was recorded by the camera from FIG. 1 when viewing vehicle surroundings.

FIG. 5 shows another exemplary embodiment of a camera image 300, which a camera 110 according to FIG. 1 has recorded of vehicle surroundings. Reflector posts 315 are again recognizable, according to the approach presently provided, a corresponding subsection 320 being produced, which has these reflector posts 315 and which may be transmitted, for example, to light control module 160 for better illumination of the curved roadway by cornering light.

Figure 6:
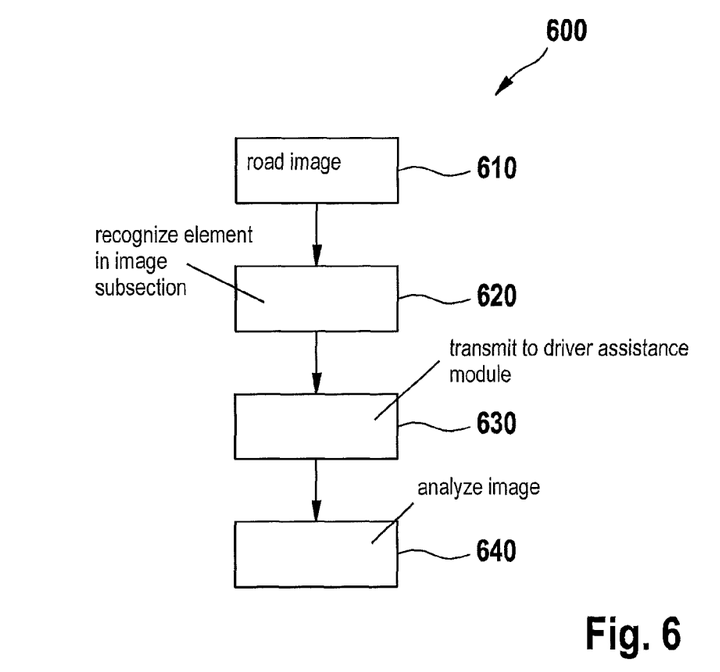
FIG. 6 shows a flow chart of an exemplary embodiment of the present invention as a method.

FIG. 6 shows a flow chart of an exemplary embodiment of the present invention as a method 600 for analyzing an image recorded by a camera of a vehicle. Method 600 includes a step of reading 610 the image of the camera and a step of recognizing 620 at least one object in a subsection of the image, the subsection imaging a smaller area of the vehicle surroundings than the image. Furthermore, the method includes a step of transmitting 630 the subsection and/or information about the subsection of the image to a driver assistance module, in particular which implements a driver assistance function, which differs from solely analyzing the image recorded by the camera. Finally, method 600 includes a step of using 640 the subsection of the image and/or the information about the subsection of the image instead of the entire image in the driver assistance module, in order to analyze the image recorded by the camera.

The described exemplary embodiments shown in the figures are only selected as examples. Different exemplary embodiments may be combined with one another in their entirety or with respect to individual features. One exemplary embodiment may also be supplemented by features of another exemplary embodiment.

Furthermore, method steps according to the present invention may be executed repeatedly and in a sequence different from the one described.

If an exemplary embodiment includes an "and/or" linkage between a first feature and a second feature, this may be construed in such a way that according to one specific embodiment the exemplary embodiment has both the first feature and the second feature and according to another specific embodiment either has only the first feature or only the second feature.

What is claimed is:

1. A computer-implemented method for analyzing an image recorded by a camera of a vehicle, comprising:
   obtaining, by processing circuitry, the image of the camera;
   recognizing, by the processing circuitry, at least one object in a subsection of the obtained image, the subsection imaging a smaller area of the vehicle surroundings than the entire image;
   providing, by the processing circuitry and based on the recognition, at least one of: i) the subsection of the image, and ii) information about the subsection of the image, to a driver assistance module; and using, by the driver assistance module, the at least one of the subsection of the image and the information about the subsection of the image, instead of the entire image, to analyze the image recorded by the camera;

wherein, in the recognizing step, at least one self-luminous object is differentiated from at least one externally irradiated object to establish the subsection of the image.

2. The method as recited in claim 1, wherein, in the transmitting step, at least one of a dimension of the subsection, and a position of the subsection in the image is transmitted as the information.

3. The method as recited in claim 1, wherein, in the recognizing step, various features of the object are recognized and, in the transmitting step, extracted features are also transmitted to the driver assistance module as information.

4. The method as recited in claim 1, wherein, in the recognizing step, at least one traffic sign is recognized as an object in the subsection of the image and, in the transmitting step, the at least one of the subsection image and the information about the subsection is transmitted to a traffic sign recognition module as the driver assistance module.

5. The method as recited in claim 1, wherein, in the recognizing step, at least one of a reflector post and a street lighting unit is recognized as an object in the subsection of the image and, in the transmitting step, the at least one of the subsection of the image and the information about the subsection of the image is transmitted to at least one of a lane detection module, a lane guiding module, and a light control system, as the driver assistance module.

6. The method as recited in claim 1, wherein, in the recognizing step, at least taillights of a preceding vehicle are recognized as an object in the subsection of image and, in the transmitting step, the at least one of the subsection of the image, and the information about the subsection of the image is transmitted to at least one of a light control system, a lane detection module, and a lane guiding module, as the driver assistance module.

7. The method as recited in claim 1, wherein, in the reading step, an image of the camera is read in, which was recorded by the camera in darkness.

8. The method as recited in claim 1, wherein, in the recognizing step, at least one further object is recognized in a further subsection of the image, the further subsection imaging a smaller area of the vehicle surroundings than the image, in the transmitting step, at least one of the further subsection of the image, and further information about the further subsection of the image being transmitted to a further driver assistance module differing from the driver assistance module, and in the using step, the further subsection being used instead of the entire image in the further driver assistance module to analyze the image recorded by the camera.

9. An image processing device for processing an image recorded by a camera of a vehicle, the image processing device configured to read the image of the camera, to recognize at least one object in a subsection of the image, the subsection imaging a smaller area of the vehicle surroundings than the image, to transmit at least one of: i) the subsection of the image, and ii) information about the subsection of the image, to a driver assistance module, and to use the at least one of the subsection of the image and the information about the subsection of the image, instead of the entire image, in the driver assistance module to analyze the image recorded by the camera, wherein, during the recognizing of the at least one object in the subsection of the image, at least one self-luminous object is differentiated from at least one externally irradiated object to establish the subsection of the image.

10. A non-transitory computer readable storage medium, the storage medium storing program code for analyzing an image recorded by a camera, the program code when executed by a control unit, causing the control unit to perform:

obtaining the image of the camera;

recognizing at least one object in a subsection of the obtained image, the subsection imaging a smaller area of the vehicle surroundings than the entire image;

based on the recognition, providing at least one of: i) the subsection of the image, and ii) information about the subsection of the image, to a driver assistance module, wherein the driver assistance module to which the at least one of the subsection of the image and the information about the subsection of the image is provided is configured to use the at least one of the subsection of the image and the information about the subsection of the image, instead of the entire image, to analyze the image recorded by the camera;

wherein, in the recognizing step, at least one self-luminous object is differentiated from at least one externally irradiated object to establish the subsection of the image.

11. The computer readable storage medium of claim 10, wherein the information about the subsection of the image is at least one of: (i) a position of the subsection, (ii) a size of the subsection, (iii) a dimension of the subsection, and (iv) a parameter of the at least one object in the subsection.

12. The image processing device of claim 9, wherein the information about the subsection of the image is at least one of: (i) a position of the subsection, (ii) a size of the subsection, (iii) a dimension of the subsection, and (iv) a parameter of the at least one object in the subsection.

13. The method as recited in claim 2, wherein the dimension of the subsection includes at least one of: (i) a shape of the subsection and (ii) an orientation of the subsection in relation to an upper edge of the image or a lower edge of the image.

14. The method as recited in claim 13, wherein the parameter of the at least one object in the subsection is one of a brightness of the at least one object and a color of the at least one object.

15. The method as recited in claim 1, wherein:
in the recognizing step, at least one of a color and a brightness of the at least one object is recognized, and
in the transmitting step, at least one of the color and the brightness is transmitted to the driver assistance module.

16. The method as recited in claim 1, wherein the information about the subsection of the image is at least one of: (i) a position of the subsection, (ii) a size of the subsection, (iii) a dimension of the subsection, and (iv) a parameter of the at least one object in the subsection.

17. The method as recited in claim 1, further comprising:
determining the driver assistance module is an affected driver assistance module from a plurality of driver assistance modules,
wherein, in the transmitting step, the at least one of the subsection image and the information about the subsection is transmitted to the affected driver assistance module.

18. The method as recited in claim 17, wherein, in the transmitting step, a separate subsection of the image is transmitted to each of multiple different driver assistance modules from the plurality of driver assistance modules.

19. The method as recited in claim 1, wherein the subsection of the image is provided, and the provided subsection is an area larger than the recognized at least one object.

\* \* \* \* \*